United States Patent
Besati et al.

(10) Patent No.: US 6,490,062 B1
(45) Date of Patent: Dec. 3, 2002

(54) DEVICE AND METHOD FOR TESTING THE OPERATION OF OPTICAL FIBER COMMUNICATION NETWORKS

(75) Inventors: Gianni Besati, Vimercate; Lucia Bianchi, Milan; Ernesto Colizzi, Monza, all of (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/203,356

(22) Filed: Dec. 2, 1998

(30) Foreign Application Priority Data

Dec. 5, 1997 (IT) ......................................... TO97A1063

(51) Int. Cl.⁷ ............................................. H04B 10/08
(52) U.S. Cl. ......................... 359/110; 359/119; 359/161
(58) Field of Search ................................. 359/110, 119, 359/154, 161

(56) References Cited

U.S. PATENT DOCUMENTS 5,745,476 A * 4/1998 Chaudhuri ................... 370/222
5,760,934 A * 6/1998 Sutter et al. ................. 359/119
5,761,353 A * 6/1998 Van Der Tol et al. ........ 385/16

OTHER PUBLICATIONS

Ellinas et al, "Automatic Protection Switching for Link Failures in Optical Networks with Bi–Directional Links", Global Telecommunications Conference, vol. 1, pp. 152–156, 1996.*
ITU–T Recommendation G.841 (Draft), Apr. 1995, "Types and Characteristics of SDH Network Protection Architectures", 99 pages.
ETSI DTS/TM–03041 Version 2.5, Sep. 1995, Transmission and Multiplexing (TM) SDH Network Protection Interworking, 80 pages.
ANSI T1.105.01—1998 "for Telecommunications–Synchronous Optical Network (SONET)—Automatic Protection Switching", 102 pages.

* cited by examiner

Primary Examiner—Thomas Mullen
(74) Attorney, Agent, or Firm—Sughrue Mion, PLLC

(57) ABSTRACT

A device for testing the operation of communication networks, specifically MS-SPRING optical fiber communication networks, which includes a traffic protection function. Modulation and measurement elements (A, BK, CHKR, CHKT) are provided, which elements can be driven by a processor (PC) to execute automatic test of the operation of the traffic protection function (12) for one or more rings; (1, 11) of the optical fiber communication network.

16 Claims, 5 Drawing Sheets

DEVICE AND METHOD FOR TESTING THE OPERATION OF OPTICAL FIBER COMMUNICATION NETWORKS

BACKGROUND OF THE INVENTION (1) Field of the Invention

The present invention relates to a device and method for testing the operation of communication networks, specifically MS-SPRING optical fiber communication networks, which provides for traffic protection means (Multiplexed-Shared Protection Ring).

(2) Description of the Prior Art

In present telecommunication networks it has become extremely important to be able to restore failures occurring in said networks without jeopardizing their service function.

For this reason, telecommunication networks, specifically optical fiber networks, are equipped with protection means to protect them against any failure of the network elements.

In MS-SPRING networks a distributed protection mechanism is implemented for automatically restoring the traffic in case of any defects in the connecting fibers.

MS-SPRING networks perform the automatic traffic restoring through a synchronized rerouting of said traffic which is carried out at each ring node. This operation is controlled by a protocol consisting of 16-bit configured patterns, which are continuously exchanged between adjacent nodes. Said protocol and the operations involved thereby with reference to the different bit patterns are defined by many international standards issued by ANSI, ITU-T and ETSI.

To this purpose, reference is made for instance to 'CCITT Recommendation G 841, Draft, April 1995', 'ETSI DTR TM-03041, September 1995', 'ANSI T1-105-1998'.

The standards define two kinds of MS-SPRING networks, one for two-fiber rings, i.e. each ring node is connected with another node by a span consisting of two optical fibers conveying signals propagating in opposite directions, the other one for four-fiber rings able of conveying a higher amount of traffic.

FIG. 1 shows a MS-SPRING two-fiber network ring 1. Said ring 1 consists of a set of 6 network elements or nodes NE. In general, network elements NE can be in number of 2 to 16. Each network element NE has two bi-directional communication ports PO, i.e. each port operates both for transmission and reception. One communication port PO is dedicated for clockwise traffic E and the other for counter-clockwise traffic W.

Two adjacent network elements NE are joined together by a span SP, which span SP consists of two connections CN, each of them obtained by an optical fiber and conveying traffic in opposite directions, i.e. one in clockwise direction E and the other one in counter-clockwise direction W.

In order to provide protection without affecting too much the bandwidth usage, the bandwidth in the MS-SPRING network ring 1 is split in two halves of equal capacity, designated work capacity and protection capacity. Work capacity is used for high priority traffic, whereas protection capacity is used for low priority traffic, the latter going lost in case of failure.

Protection in MS-SPRING network ring 1 is implemented according to a so-called Bridge-and-Switch technique, consisting essentially in re-routing traffic from work capacity to protection capacity in opposite direction through a proper change of the network element internal connections.

Such a protection technique, designated APS (Automatic Protection Switch), requires for each network element to contain a device, designated APS controller, which is capable of detecting line failures, communicating information related to the other network elements and performing Bridge-and Switch type switching.

The protection system of a MS-SPRING network, substantially based on said APS controllers, requires execution of tests of said system to check its full functionality. This operation is usually carried out for each new MS-SPRING network version released by the manufacturer, substantially with the aim of testing that the functionality of said system has not been jeopardized by updating operations, i.e. the issue of a new version with new technical capabilities.

This involves several problems, since complexity of tests depends at least on the number of nodes of the network rings to be tested, on the number of stable states the MS-SPRING network may have and which have to be tested, and on the high number of events occurring in a MS-SPRING network, which have to be reproduced during test. Moreover, the operator carrying out such tests is required to transmit a high number of commands and, finally, the test results can only be understood and evaluated by specially trained operators having a wide knowledge of MS-SPRING network features.

It is the object of the present invention to solve the above drawbacks and provide a device or system for testing the operation of MS-SPRING communication networks, having a more effective and improved performance.

In this scenario, it is the main object of the present invention to provide a device or system for testing the operation of communication networks using an automated test apparatus.

Another object of the present invention is to provide a system or device for testing the operation of communication networks, capable of automatically testing different network types without requiring any manual operation by the operator.

Another object of the present invention is to provide a system or device for testing the operation of communication networks having a number of tests whose execution provides significant information about the network function.

A further object of the present invention is to provide a system or device for testing the operation of communication networks having an automatic procedure for test result evaluation.

Said objects are reached by the present invention by a system for testing the operation of communication networks and/or a method for testing the operation of an optical fiber network incorporating the features of the annexed claims, which form an integral part of this description.

Further objects, features and advantages of the present invention will become apparent from the following detailed description and annexed drawings, which are only supplied by way of an explanatory non limiting example.

SUMMARY OF THE INVENTION

The device for testing the operation of communication networks, specifically MS-SPRING optical fiber communication networks according to the present invention comprises traffic protection means and further comprises modulation and measurement elements which can be driven by a controller to execute automatic test of the operation of the traffic protection means for one or more rings of the optical fiber communication network.

The method for testing the operation of a MS-SPRING optical fiber network according to the present invention comprises: installing, on one or more rings of the optical fiber, network modulation and measurement elements, which elements can be remote controlled; connecting a controller with said modulation and measurement elements through first interface means, and with network elements of said rings through second interface means, respectively; installing the network of optical switches between the network elements; installing test pattern generators/checkers on the desired network elements; and executing a failure simulation and operation test procedure through the processor.

Finally, the apparatus for testing the operation of an optical fiber network, specifically MS-SPRING, comprises modulation and measurement elements, associated with one or more rings of an optical fiber communication network, which can be controlled by a processor and which simulate failures indicating whether the traffic protection means contained in the communication network are operating.

DETAILED DESCRIPTION OF THE PREFERRED EMBODIMENT

Figure 1:
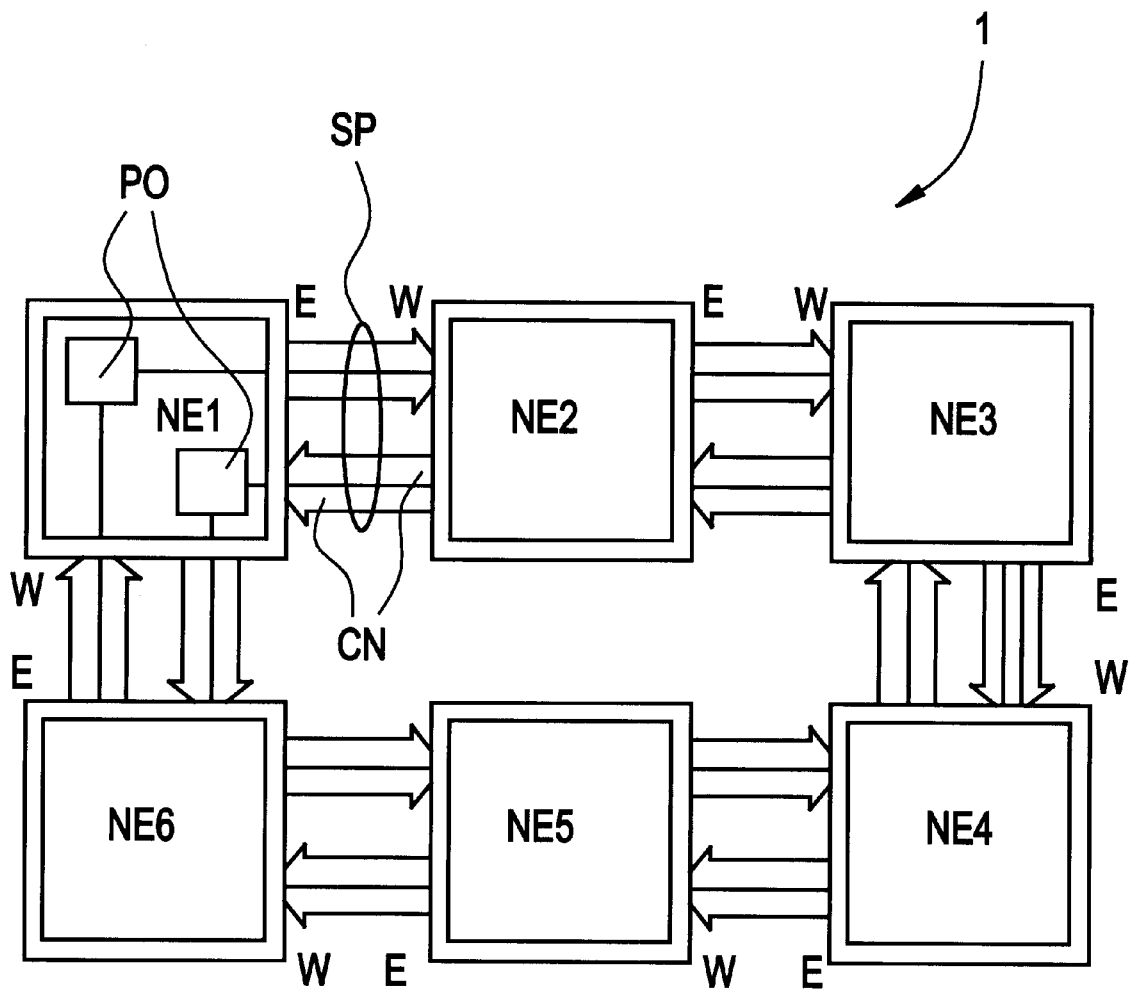
FIG. 1 shows a basic diagram of an MS-SPRING telecommunication network.
Figure 2:
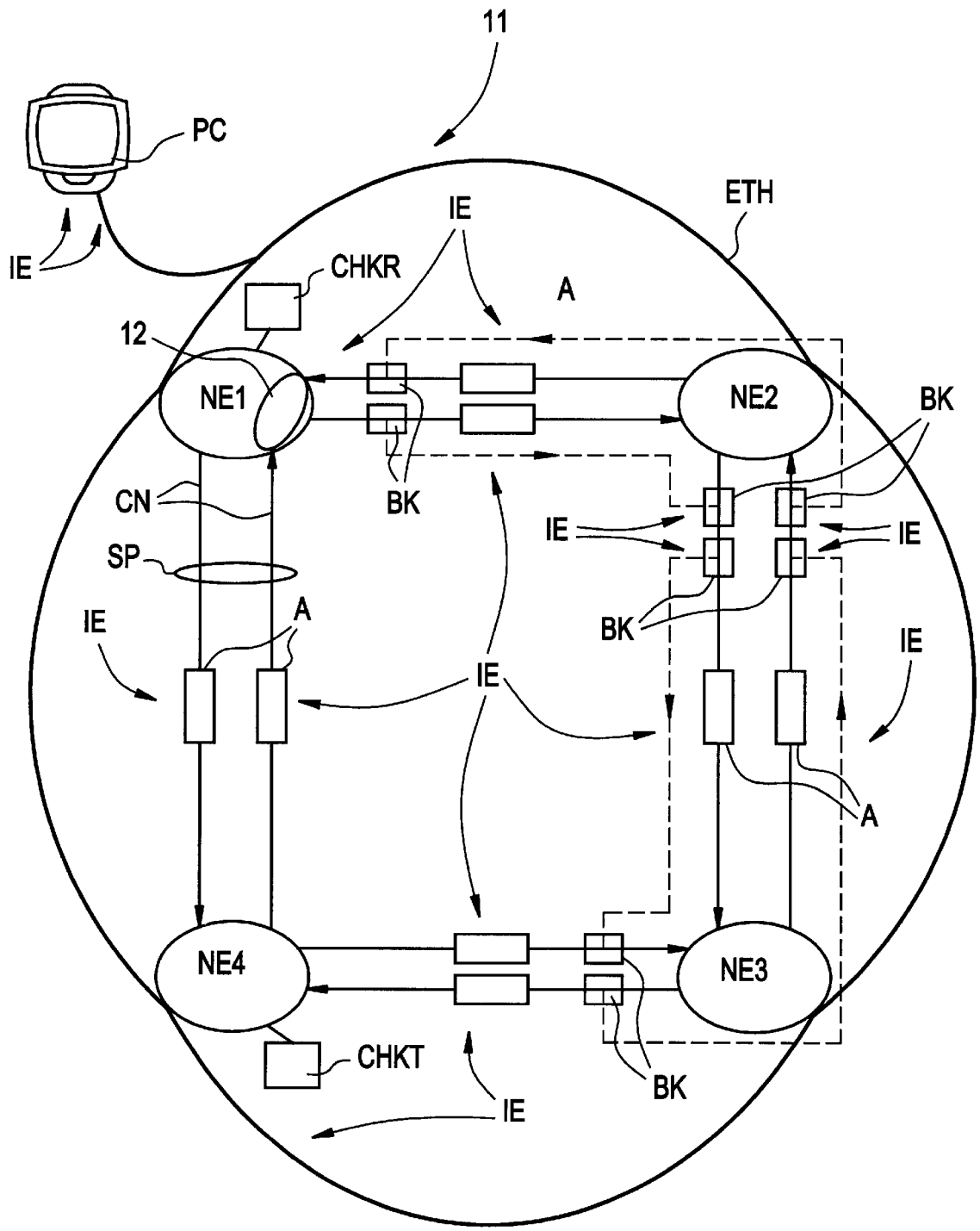
FIG. 2 shows a basic diagram of the system for testing the operation of an MS-SPRING optical fiber network according to the present invention.

FIG. 2 shows a MS-SPRING network ring 11, which comprises four network elements NE, i.e. NE1 to NE4, joined by spans SP, consisting of two connections CN conveying traffic in opposite directions. Each network element NE contains an APS controller 12 to protect traffic through proper switching and selections as already described with reference to FIG. 1. Each connection CN of every span SP has interposed an optical attenuator A thereon. Said optical attenuator A is able to perform, upon command, a signal attenuation thus causing errors in bit recognition. Moreover, a processor PC, being in communication with attenuators A through a communication interface IE, which in this instance operates according to the known communication protocol IEEE488 is also provided. The communication interface IE also connects the processor PC with a network of optical switches BK. Said network of optical switches BK can be set according to the requirements to connect the network element NE1 with the network element NE3, skipping the network element NE2, or even with the network element NE4, skipping network elements NE2 and NE3. Through the actuation of the optical switches BK network, then it is possible to go from a 4-node ring 11 configuration to another 3-node or 2-node configuration. The network element NE4 and network element NE1 are also connected with test pattern generators/checkers CHKT and CHKR, a transmitter and a receiver, respectively, also controlled by the processor PC through the interface IE. The test pattern generators/checkers CHKT and CHKR are able to verify the consequences of automatic traffic restoring on a connection CN, whose terminals they are connected with. They are capable, in fact, of generating pseudorandom strings to the transmitter at regular intervals, e.g. between $2^{23}-1$ and $2^{15}-1$, and controlling the correct operation through a correct reception at the receiver.

Moreover, the processor PC is connected with each network element NE through an Ethernet-type communication network ETH.

Thus, the processor PC will remote control optical attenuators A through the interface IE and is then able, introducing a proper attenuation on connections CN, to simulate e.g. the conditions corresponding to 'Signal Fail', producing a $2^{-2}$ bit error rate, or the conditions corresponding to 'Signal Degrade', producing a $2^{-5}$ bit error. Moreover, it can change ring 11 size by properly driving the network of optical switches BK and, finally, use test pattern generators/checkers CHKT and CHKR to evaluate the consequences of automatic traffic restoring on a connection CN. Connection through communication network ETH allows the processor PC to interact with all four network elements NE.

Thus, the processor PC can use optical attenuators A of the network of optical switches BK, test pattern generators/checkers CHKT and CHKR and communicate through the communication network ETH with network elements NE to combine event generation in the ring 11 and store the results through a proper managing software.

Figure 3:
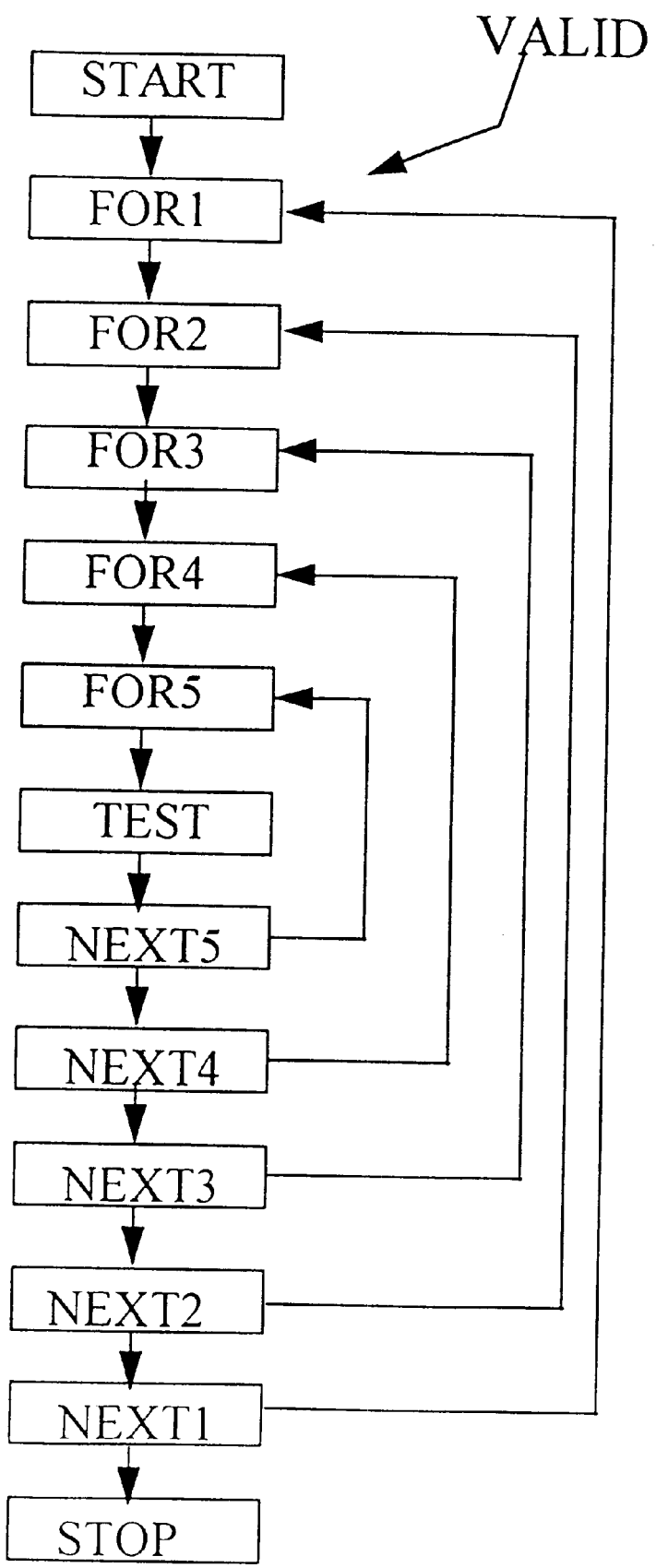
FIG. 3 shows a flowchart of the test program executed by the test system of FIG. 2.

FIG. 3 shows a flowchart of the test procedure VALID to be executed, which is executed by the processor PC. Five nested loop instructions FOR1, FOR2, FOR3, FOR4, FOR5 are available after the start step START. Loop instruction FOR1 executes the cycle by changing its index according the number of network elements NE (in the specific instance 1 to 4), loop instruction FOR2 changes its index according to connections CN of the ring 11 as well as the loop instruction FOR3 nested inside it. The effect of both the nested loop instruction FOR2 and the loop instruction FOR3 is to select all possible connection pairs CN, which are twice the squared number of network elements NE, i.e. 32 for the embodiment described above. Loop instruction FOR4 executes its cycle causing its index to change according to 8 different types of a first failure G1, loop instruction FOR5 executes its cycle causing its index to change according to 8 different types of a second failure G2. All the 8 failure types G1 or G2 considered in this embodiment are, by way of example:

manual switch west;
degraded signal west;
forced switch west;
signal fail west;
manual switch east;
degraded signal east;
forced switch east;
signal fail east.

For clarity's sake, manual switch (either east or west) and forced switch (either east or west) are either failures or, better, events which are normally introduced by the operator through the APS controller 12 and substantially similar to a degraded signal. For instance, a forced switch east has the same effect of a failure affecting connection CN entering a node NE from the clockwise direction E.

Also in this instance there will be 64 possible failure pairs G1 and G2.

Said failures G1 and G2 are processed by the processor PC, for example by properly driving optical attenuators A.

All the five loop instructions FOR1, FOR2, FOR3, FOR4, FOR5 are ended by their respective return instructions NEXT1, NEXT2, NEXT3, NEXT4, NEXT5, which close the loops. Then, inside the nested loops is a test step TEST, completely shown in the flowchart of FIG. 4. Again with reference to the flowchart of FIG. 3, it can be seen that the purpose is to perform a test step TEST of all the network elements NE (instruction FOR1), of all the possible connection pairs CN, of 8 possible types of a first failure G1, making a correspondence with the happening of 8 corresponding possible types of a second failure.

Figure 4:
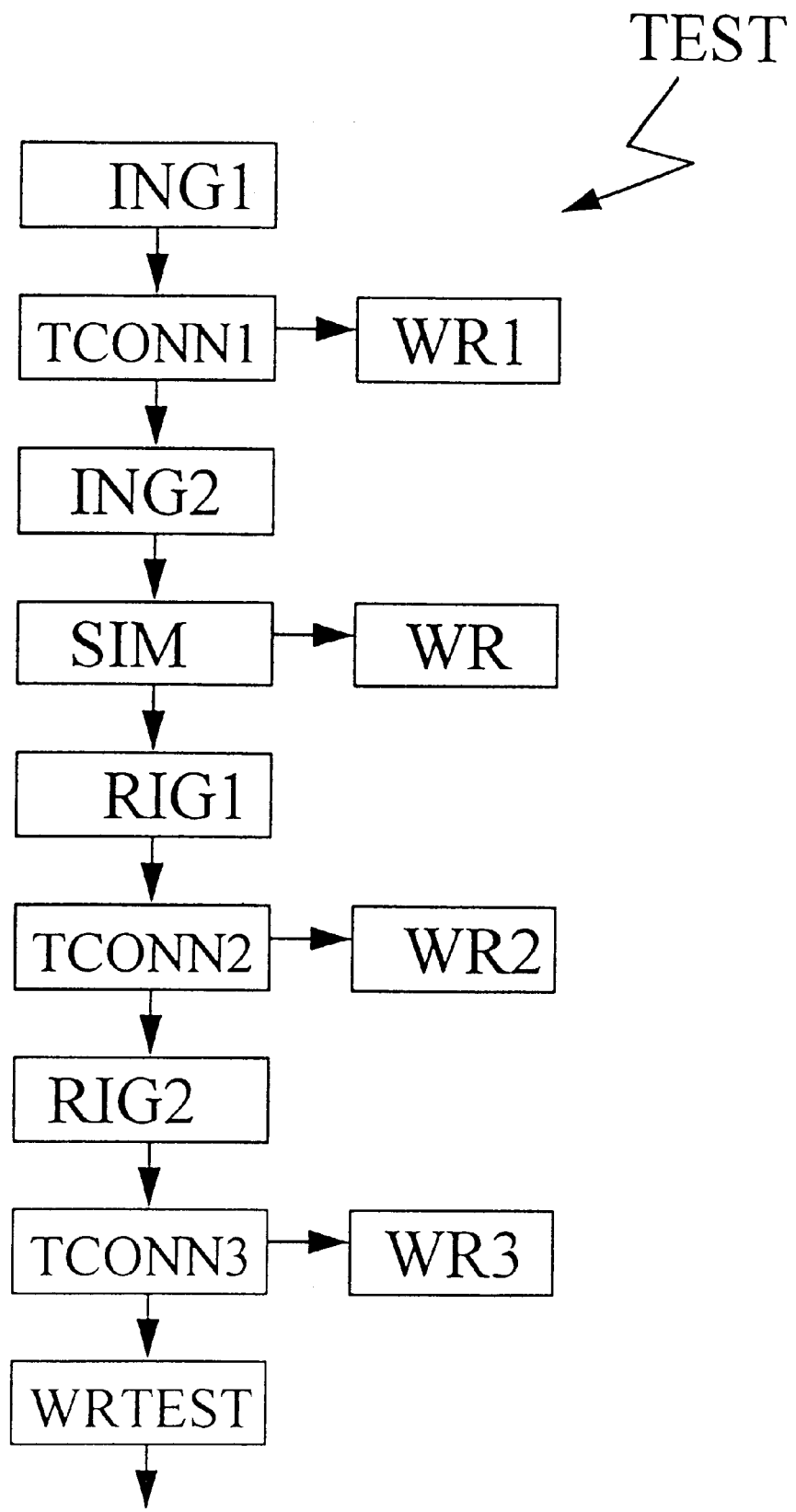
FIG. 4 shows a flowchart of a step (TEST) of the chart of FIG. 3.

From the flowchart of FIG. 4 it can be noticed that the test step TEST comprises a step ING1 of insertion of the first failure G1, wherein optical attenuators A are controlled for instance to attenuate the signal on a connection CN until a 'Signal fail' condition, a connection test step TCONN1 comprising a result storage step WR1 which in this instance is a writing operation in the storage memory of the processor PC. The connection test step TCONN1 is substantially a test on a span SP executed by test pattern generators/checkers CHKT and CHKR. Then a step ING2 of insertion of the second failure G2 follows. The subsequent step is a failure simulation step SIM, shown more in detail in the flowchart represented in FIG. 5. The failure simulation step SIM is accompanied by a step WR for the storage of results. The storage step WR will store in the processor PC not only the results of the test executed in the failure simulation step, but also the results of a comparison with a theoretic simulation executed through a plurality of tests of conditions COND which are simulated by the processor PC and shown in FIG. 5, in order to make the results of the test procedure VALID promptly clear for the operator. During the failure simulation step SIM, theoretic simulation is executed by the processor PC and, given the failure conditions set by the test procedure VALID, states which conditions the connections CN are to be at, i.e. either operating, degraded or failed conditions. Thus, the simulated result is an expected result to be compared with the real result obtained through the connection test steps. The operator of the processor PC will only obtain information such as 'Successful Check' or 'Check Failure', that are promptly understandable, without knowing the expected test result. Subsequently, a step, RIG1, of removal of the first failure G1, i.e. the processor PC will deactivate e.g. the optical attenuator A which was previously enabled, a connection test step TCONN2, corresponding to a storage step of results WR2, a step RIG2 of removal of the second failure G2, and a step TCONN3 of connection test, corresponding to a storage step of results WR3, will be executed. Finally, there will be a step WRTEST of result storage.

Figure 5:
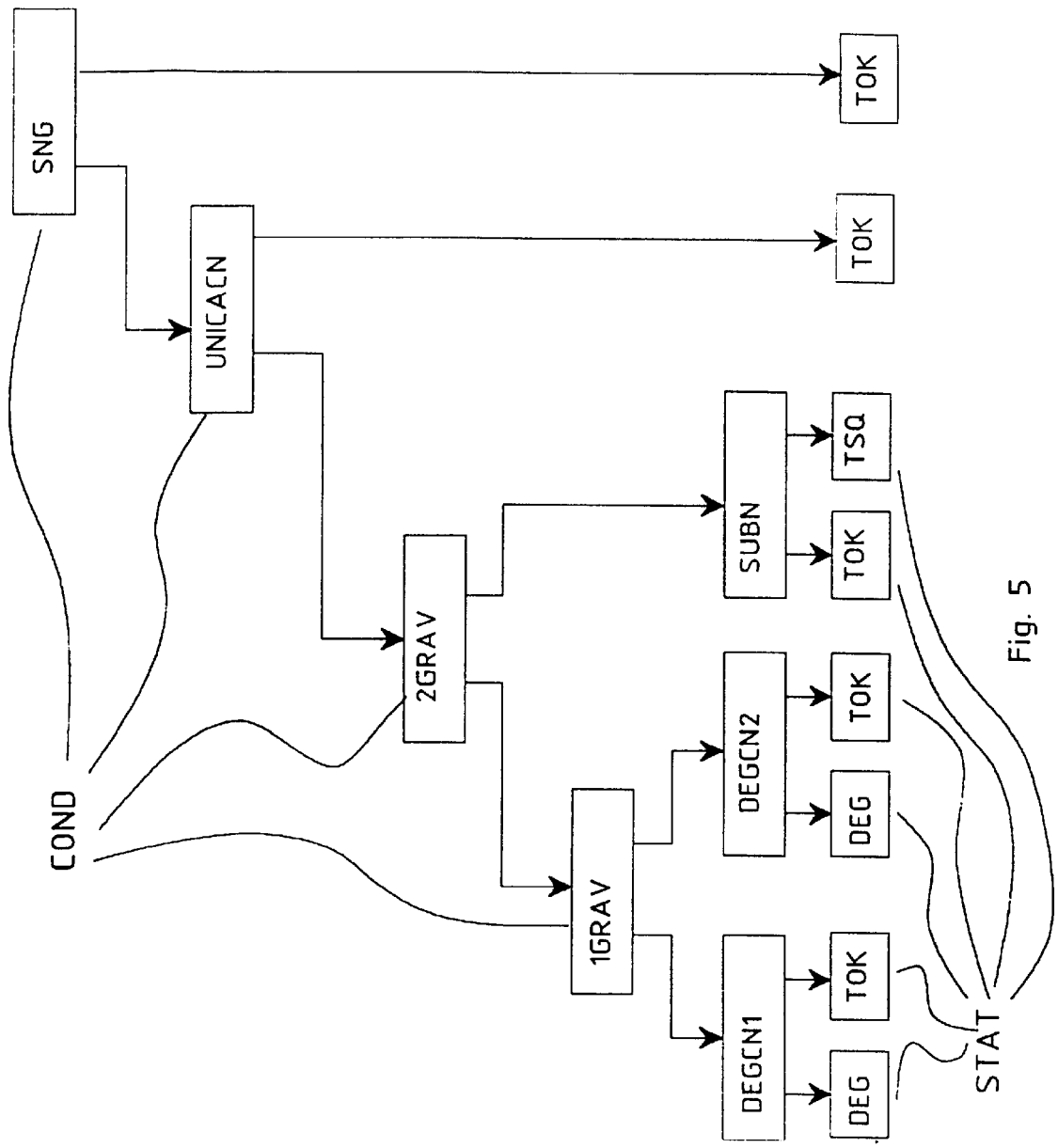
FIG. 5 shows a flowchart of a step (SIM) of the chart of FIG. 4.

In FIG. 5 the flowchart of the failure simulation step SIM is shown. Said failure stimulation step SIM consists in a simulation of a plurality of conditions COND tests, which are apt to define whether the connection CN in question should be detected while it is operating correctly or in a degraded mode, or squelched. Said conditions COND tests will then determine some state signals STAT, which are listed here below along with the conditions COND tests they are determined from:

TOK: signal of regular traffic state;
DEG: signal of degraded traffic state;
TSQ: signal of squelched traffic state;
SNG: it verifies whether the failure in the ring 11 is either single or double. If it is a single failure, it passes to TOK, whereas as in the instance of a double failure it will go to UNICACN.
UNICACN: it checks whether both preselected connections CN belong to the same span SP of the ring 11. In the affirmative, it gives back a state signal TOK, in the negative it goes to 2GRAV.
2GRAV: it verifies whether the serious failure is single or double. In the first instance, i.e. a single failure, it goes to 1GRAV, in the second instance, i.e. a serious double failure it goes to SUBN.
1GRAV: it verifies whether at least one of both failures belongs to the serious failure class. In the affirmative it goes to DEGCN1, in the negative it goes to DEGCN2.
SUBN: it verifies whether serious failures have occurred only within a subnetwork. In the affirmative it gives back a state signal TOK, in the negative a state signal TSQ.
DEGCN1: it verifies whether the protected connection goes through a degraded connection CN. In the affirmative it gives back a state signal TOK, in the negative a state signal DEG.
DEGCN2: it verifies whether the original connection was going through a degraded connection. In the affirmative it gives back a state signal DEG, in the negative a state signal TOK.

Therefore, the ring 11 is tested by the following procedure:

installation of optical attenuators A on connections CN;
installation of the network of optical switches BK between network elements NE;
installation of test pattern generator checkers CHKT andCHKR on desired network elements NE;
connection of the processor PC with optical attenuators A, with the network of optical switches BK, with the test pattern generators/checkers CHKT and CHKR and with the network elements NE through interfaces IE and communication network ETH;
execution by the processor PC of the test procedure VALID described in the flowcharts of FIGS. 3, 4 and 5.

At the end of said procedure, the operator will have a document, either hard copy or displayed on the processor PC monitor, reporting in an easy-to-evaluate manner the operation test result, i.e. whether the network is operating correctly or has failures.

According to the above description the features of the present invention as well as its advantages will be clear. The system or device for testing the operation of an optical fiber network according to the present invention is based on the use of a fully automated test apparatus, on the use of a standard electronic processor and testing elements being properly located in the network. As seen above, the program to be executed by the processor is quite simple and within reach of most basic programming languages.

Thus, various network kinds can be automatically tested without any manual intervention by the operator, except for the installation of the various test devices.

The system or device for testing the operation of an optical fiber network according to the present invention also comprises a number of test steps whose execution gives significant information about the network operation. Obviously, the number of tests to be executed can be increased, the same as the number of concurrent failures, so as to increase the number of possible failure conditions to be covered. It is obvious that the number of tests is chosen compatible with the speed of the test system for executing them.

Finally, the system for testing the operation of an optical fiber network according to the present invention comprises an automatic procedure to evaluate the test result through a comparison with theoretic simulations, so as to give direct indication to the operator about a positive or negative test result.

It is obvious that many changes are possible for the man skilled in the art to the system for testing the operation of an optical fiber network described above by way of example, without departing from the novelty spirit of the innovative idea, and it is also clear that in its practical execution the details illustrated may often differ in form and size from the ones described and be replaced with technical equivalent elements.

The size of the network rings the test system is applied to may eventually be different, and also simulated failures may differ from the ones described above.

Also failure simulation devices may be different, depending on what kind of failure has to be simulated.

We claim:

1. A device for testing the operation of communication networks, specifically MS-SPRING optical fiber communication networks comprising one or more rings, said device comprising traffic protection means, wherein the device further comprises modulation and measurement elements which can be driven by a controller to execute automatic test of the operation of the traffic protection means for one or more rings of the optical fiber communication network.

2. A device for testing the operation of communication networks according to claim 1, wherein the controller controls the modulation and measurement elements through first interface means.

3. A device for testing the operation of communication networks according to claim 2, wherein second interface means are provided between the controller and network elements of the communication network.

4. A device for testing the operation of communication networks according to claim 3, wherein the network rings comprise connections and the modulation and measurement elements comprise at least optical power attenuation means which can be interposed on connections of the rings.

5. A device for testing the operation of communication networks according to claim 4, wherein the modulation and measurement elements comprise at least optical switch networks, located between the network elements.

6. A device for testing the operation of communication networks according to claim 5, wherein the modulation and measurement elements comprise at least test pattern generators and checkers that can be associated with network elements.

7. A device for testing the operation of communication networks according to claim 6, wherein the controller comprises a processor which is able to execute a failure simulation and operation test procedure.

8. A device for testing the operation of communication networks according to claim 7, wherein said failure simulation and operation test procedure is stored in the processor.

9. A device for testing the operation of communication networks according to any of claims 7 or 8, wherein the failure simulation and operation test procedure comprises the execution of a test step which is iterated in a cycle for each of plural different network elements and/or in a cycle for each of plural different types of a first failure and/or in a cycle for each of plural different types of a second failure.

10. A device for testing the operation of communication networks according to claim 9, wherein said test step comprises failure insertion steps and failure removal steps alternated with steps for testing the connections and result storage steps.

11. A method for testing the operation of a MS-SPRING optical fiber network, wherein the method comprises the following steps:

installing, on one or more rings of the optical fiber having network elements, modulation and measurement elements which can be remote controlled;

connecting a controller with said modulation and measurement elements through first interface means, and with the network elements of said rings through second interface means, respectively;

installing a network of optical switches between the network elements;

installing test pattern generators/checkers on the desired network elements; and executing a failure simulation and operation test procedure through the processor.

12. A method for testing the operation of an optical fiber network according to claim 11, wherein the failure simulation and operation test procedure comprises executing a test step which is iterated in a cycle for each of plural different network elements and/or a cycle for each of plural different types of a first failure and/or a cycle for each of plural different types of a second failure.

13. A method for testing the operation of an optical fiber network according to claim 12, wherein said test step comprises failure insertion steps and failure removal steps, alternated with connection test steps and result storage steps.

14. A method for testing the operation of an optical fiber network according to claim 13, wherein at least one of the connection test steps comprises a plurality of condition tests on the ring, which comprise simulations of the operation of the ring connections executed only by the processor.

15. An apparatus for testing the operation of an optical fiber network comprising one or more rings, wherein the apparatus comprises modulation and measurement elements, associated with the one or more rings of an optical fiber communication network, which can be controlled by a processor and which simulate failures indicating whether traffic protection means contained in the communication network are working.

16. An apparatus for testing the operation of an optical fiber network according to claim 15, wherein it also comprises first interfacing means between the processor and the modulation and measurement elements, and second interfacing means between the processor and network elements of the communication network ring.

* * * * *